US00RE44069E

(19) United States
(12) Reissued Patent
Hikata

(10) Patent Number: US RE44,069 E
(45) Date of Reissued Patent: Mar. 12, 2013

(54) METHOD OF PRODUCING CARBON NANOSTRUCTURE

(75) Inventor: Takeshi Hikata, Osaka (JP)

(73) Assignee: Sumitomo Electric Industries, Ltd., Osaka (JP)

(21) Appl. No.: 13/369,269

(22) Filed: Feb. 8, 2012

Related U.S. Patent Documents

Reissue of:
(64) Patent No.: 7,658,971
Issued: Feb. 9, 2010
Appl. No.: 10/591,740
PCT Filed: May 19, 2005
PCT No.: PCT/JP2005/009154
§ 371 (c)(1),
(2), (4) Date: Sep. 6, 2006
PCT Pub. No.: WO2005/121023
PCT Pub. Date: Dec. 22, 2005

(30) Foreign Application Priority Data

Jun. 8, 2004 (JP) ..... 2004-170016

(51) Int. Cl.
*C23C 16/00* (2006.01)
(52) U.S. Cl. ..... 427/249.1
(58) Field of Classification Search ..... 427/249.1
See application file for complete search history.

(56) References Cited

U.S. PATENT DOCUMENTS

| | | | |
|---|---|---|---|
| 4,572,813 | A | 2/1986 | Arakawa |
| 5,114,641 | A | 5/1992 | Yamamoto et al. |
| 6,146,227 | A | 11/2000 | Mancevski |
| 6,261,532 | B1 | 7/2001 | Ono |
| 6,350,488 | B1 | 2/2002 | Lee et al. |
| 2004/0009115 | A1 | 1/2004 | Wee et al. |

FOREIGN PATENT DOCUMENTS

| | | | |
|---|---|---|---|
| JP | 60-054998 | | 3/1985 |
| JP | 64-036703 | | 2/1989 |
| JP | 10-088256 | | 4/1998 |
| JP | 2001-020071 | | 1/2001 |
| JP | 2001-020071 | A | 1/2001 |
| JP | 2002-526354 | | 8/2002 |
| JP | 2002-526354 | A | 8/2002 |
| JP | 2002-255519 | | 9/2002 |
| JP | 2002-255519 | A | 9/2002 |
| JP | 2003-277033 | | 10/2003 |
| JP | 2003-292315 | | 10/2003 |
| JP | 2003-292315 | A | 10/2003 |

OTHER PUBLICATIONS

English Translation of Taiwanese Office Action, dated Mar. 9, 2011 for Application No. 094118298.
English counterpart publication WO 00/19494, published Apr. 6, 2000.
Japanese Office Action dated Jul. 14, 2009, issued in related Japanese application 2004-170016.

*Primary Examiner* — Roberts Culbert
(74) *Attorney, Agent, or Firm* — Foley & Lardner LLP

(57) ABSTRACT

A method of producing a carbon nanostructure is provided which can increase evenness of a shape and a purity of the carbon nanostructure and can reduce a production cost. In a method of producing a carbon nanostructure, a carbon crystal is grown by vapor phase epitaxy from a crystal growth surface of a catalyst base including a catalyst material, and the catalyst base is formed by diameter-reduction processing. The catalyst base is preferably formed as an aggregate including an arrangement of a plurality of catalyst structures each formed with a non-catalyst material, a material not having a substantial catalytic function for growth of the carbon crystal, formed on at least a portion of a side surface of the catalyst material of a columnar shape having the crystal growth surface as a top surface. In addition, a non-catalyst material is preferably formed on at least a portion of a side surface of the aggregate, and the catalyst structures preferably have variations of at most CV 10% in surface areas of the catalyst material on the crystal growth surface.

14 Claims, 5 Drawing Sheets

METHOD OF PRODUCING CARBON NANOSTRUCTURE

Matter enclosed in heavy brackets [ ] appears in the original patent but forms no part of this reissue specification; matter printed in italics indicates the additions made by reissue.

TECHNICAL FIELD

The present invention relates to a method of producing a carbon nanostructure which enables a carbon nanostructure having a more even shape to be produced stably and at a high purity, and which can also reduce a production cost.

BACKGROUND ART

A carbon nanotube, which is formed with carbon atoms arranged in a tubular shape having a diameter of a nanometer level, has been receiving considerable attention in recent years as a carbon-based highly functional material having advantages such as high conductivity and mechanical strength. As one method of generating the carbon nanotube, a thermal decomposition method has been devised, in which thermal decomposition of a material gas such as an alcohol-based or hydrocarbon-based gas is performed in a heating furnace using a catalyst particle having a diameter of a nanometer level to grow a carbon crystal on the catalyst particle to form the carbon nanotube. The thermal decomposition method includes a method in which a base material is made to carry the catalyst particle by application or the like, or a method in which a catalyst is suspended in a vapor phase.

Japanese Patent Laying-Open No. 60-054998 (Patent Document 1), for example, proposes a method of generating a vapor phase epitaxy carbon fiber in a suspended state by heating a mixed gas including a gas of an organotransition metal compound, a carrier gas and a gas of an organic compound to 800-1300° C.

Japanese Patent Laying-Open No. 2001-020071 (Patent Document 2) proposes a method of synthesizing a carbon nanotube including a step of forming a catalyst metal film on a substrate, a step of etching the catalyst metal film to form an isolated nano-sized catalyst metal particle, and a step of supplying a carbon source gas into a thermochemical vapor phase deposition device to grow a carbon nanotube on each of the isolated nano-sized catalyst metal particle by a thermochemical vapor phase deposition method to form a plurality of carbon nanotubes aligned vertically on the substrate, in which the step of forming the isolated nano-sized catalyst metal particle is performed by a gas etching method using at least one eching gas selected from the group consisting of an ammonia gas, a hydrogen gas and a hydride gas after thermal decomposition.

Japanese Patent Laying-Open No. 2002-255519 (Patent Document 3) proposes a method in which a hydrocarbon gas and a carrier gas are sent onto a base including a heat resistant porous carrier carrying dispersed fine catalyst particles to vapor-phase synthesize a monolayer carbon nanotube utilizing thermal decomposition of the hydrocarbon gas.

Japanese Patent Laying-Open No. 2003-292315 (Patent Document 4) proposes a method of producing a carbon nanotube on a surface of a metal by a chemical vapor phase epitaxy method with flowing a gas as a carbon source onto a heated metal, which is characterized in that a microcrystal of an oxide is generated beforehand on the surface of the metal to form minute projections and depressions on the surface of the metal.

In a conventional method as described in each of Patent Documents 1-4, however, a carbon substance such as amorphous carbon or graphite as an impurity is generated concurrently with an intended carbon nanotube during production of the carbon nanotube. In addition, generated carbon nanotubes have large variations in diameters, and it is difficult to stably produce even carbon nanotubes.

One of causes of the variations in diameters of carbon nanotubes is variations in sizes of catalyst particles. Since it is difficult to control a shape of a catalyst particle when the catalyst particle is formed by a chemical method such as heat decomposition, variations in shapes of catalyst particles themselves are generated. Aggregation of catalyst particles also causes variations in shapes. Shapes of carbon nanotubes may also vary due to variations in growth speeds of carbon crystals on the catalyst particles.

In addition, a carbon nanotube having a large fiber length cannot be easily generated using the catalyst particle.

Patent Document 1: Japanese Patent Laying-Open No. 60-054998

Patent Document 2: Japanese Patent Laying-Open No. 2001-020071

Patent Document 3: Japanese Patent Laying-Open No. 2002-255519

Patent Document 4: Japanese Patent Laying-Open No. 2003-292315

DISCLOSURE OF THE INVENTION

Problems to be Solved by the Invention

An object of the present invention is to provide a method of producing a carbon nanostructure which solves the above-described problems, can increase evenness of a shape and a purity of the carbon nanostructure, and can reduce a production cost.

Means for Solving the Problems

The present invention relates to a method of producing a carbon nanostructure wherein a carbon crystal is grown by vapor phase epitaxy from a crystal growth surface of a catalyst base including a catalyst material, and the catalyst base is formed by diameter-reduction processing.

The catalyst base is preferably formed as an aggregate including an arrangement of a plurality of catalyst structures each formed with a non-catalyst material, a material not having a substantial catalytic function for growth of the carbon crystal, formed on at least a portion of a side surface of the catalyst material of a columnar shape having the crystal growth surface as a top surface.

In addition, a non-catalyst material is preferably formed on at least a portion of a side surface of the aggregate. Furthermore, the catalyst structures preferably have variations of at most CV 10% in surface areas of the catalyst material on the crystal growth surface of the catalyst base formed as an aggregate.

The catalyst material is preferably formed with at least one of a member selected from the group consisting of Fe, Co, Mo, and Ni, and the non-catalyst material is preferably formed with Ag and/or an Ag-containing alloy.

Surface processing is preferably performed by at least one of oxidation, nitriding and carbonization to define an interface between the catalyst material and the non-catalyst material on the crystal growth surface.

A method of alternately stacking the catalyst material and the non-catalyst material by a vapor phase method to form a catalyst base having a multilayer structure is also preferably used. With this, a catalyst base can be made which has the catalyst material in a spiral shape on the crystal growth surface.

The diameter-reduction processing of the present invention is preferably performed by at least any of drawing, extrusion, rolling, and forging.

The diameter-reduction processing is preferably performed such that, an outside diameter of a solid or hollow catalyst material after the diameter-reduction processing becomes at least $1\times10^{-6}$% and at most 1% of that before the diameter-reduction processing.

In the catalyst base used in the present invention, the catalyst material preferably has a multilayer structure on the crystal growth surface. Alternatively, the catalyst material preferably has at least any of a round shape, a ring-like shape, a polygonal shape, a spiral shape, a waved shape, and a branching shape on the crystal growth surface.

In the present invention, surface processing is preferably performed for the catalyst material of the catalyst base used. In particular, mechanical polishing and/or sputtering is preferably performed.

Processing for entering an ion in the crystal growth surface is preferably performed before and/or after the surface processing for the catalyst material of the catalyst base to prevent surface disorder of the crystal growth surface due to the mechanical polishing and/or sputtering.

The method of producing according to the present invention preferably includes the steps of supplying carbon from a non-crystal growth surface of the catalyst base to set at least a portion of carbon in the catalyst material to a saturated state, and growing a carbon crystal from the crystal growth surface.

In the present invention, a reducing gas is preferably brought into contact with at least the crystal growth surface of the catalyst material before or during growth of the carbon crystal.

In addition, an ionized material gas and/or carbon is preferably brought into contact with the catalyst base.

EFFECTS OF THE INVENTION

Since a catalyst base including a catalyst material is formed by diameter-reduction processing in the present invention, a crystal growth surface having a desired shape and an even size can be efficiently formed. With this, a carbon nanostructure having a shape reflecting a shape of the crystal growth surface can be produced stably and at a high purity. In addition, the catalyst base used in the present invention can be formed as a colunmar body exposing the catalyst material on the crystal growth surface and a non-crystal growth surface. In this situation, carbon of a higher concentration can be absorbed from the non-crystal growth surface into the catalyst material, which increases production efficiency of the carbon nanostructure and can effectively suppress generation of an impurity.

DESCRIPTION OF THE REFERENCE SIGNS

Figure 1:
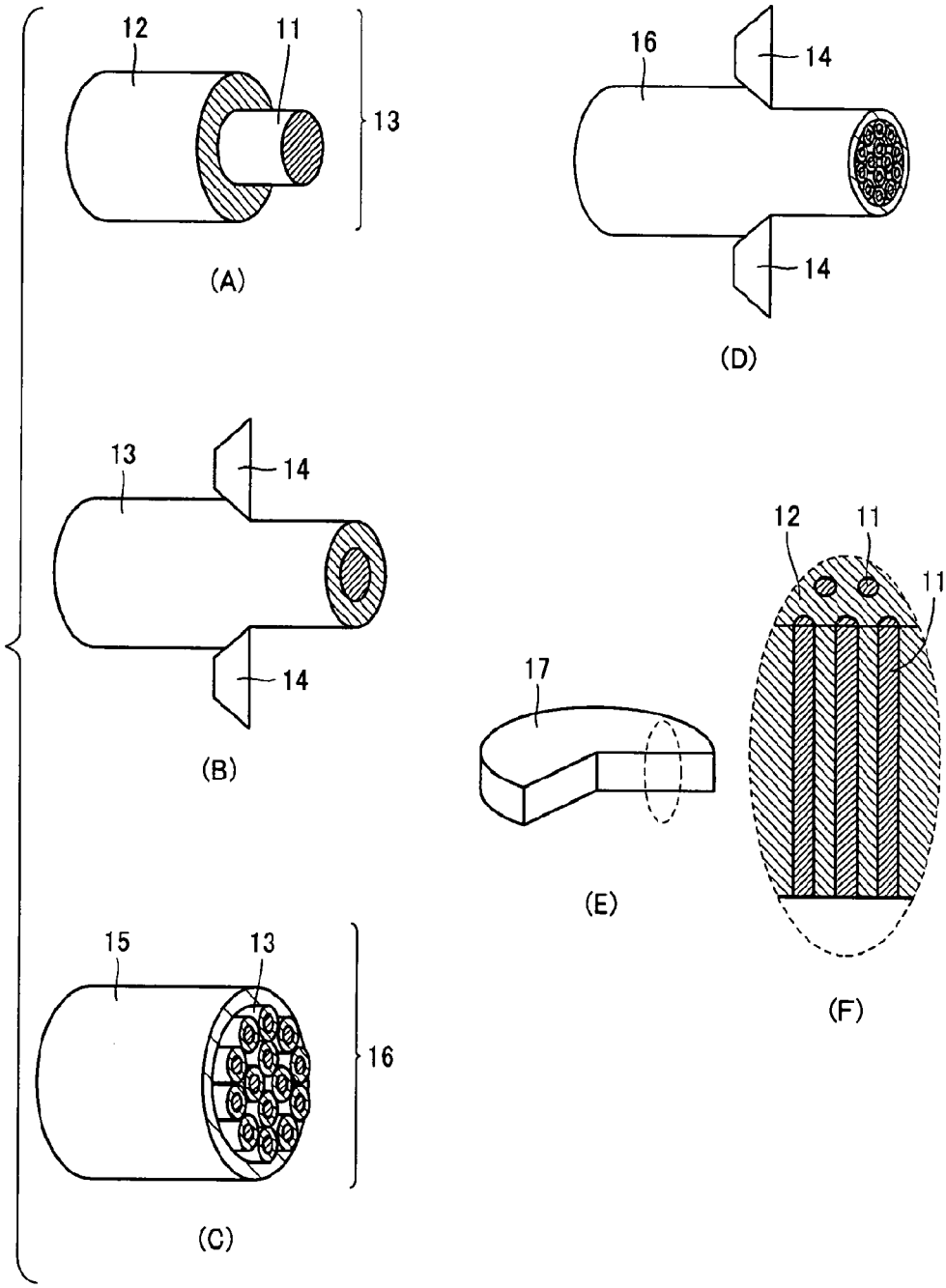
FIG. 1 shows an example of a method of making a catalyst base used in the present invention.

11, 204, 31, 41, 52, 62, 72: catalyst material, 12, 15, 201, 205, 207, 210, 32, 42, 53, 63, 73: non-catalyst material, 13, 16, 206, 208, 211: composite material, 14, 209: drawing dice, 17, 212, 54, 64, 74: catalyst base, 202, 203: deposition source, 51, 61, 71: heat and pressure-resistant heating furnace tube, 55, 66: seal material, 56: diaphragm, 57: crystal growth surface, 58, 67, 76: carbon nanostructure, 65: porous body, 75: anode.

BEST MODES FOR CARRYING OUT THE INVENTION

The present invention is characterized in that, a catalyst base including a catalyst material is formed by diameter-reduction processing, and a carbon crystal is generated by vapor phase epitaxy from a crystal growth surface formed with the catalyst material on the catalyst base to produce a carbon nanostructure having a desired shape. In the present invention, diameter-reduction processing is performed for preferably at least two times for a catalyst material or a composite material of a catalyst material and a non-catalyst material which is prepared beforehand to decrease a diameter thereof by plastic deformation of the catalyst material and the non-catalyst material, which enables making of a catalyst base having a very small crystal growth surface of a nanometer size with high accuracy. With this, a shape of the crystal growth surface can be arbitrarily set according to a desired shape of a carbon nanostructure such as a carbon nanotube or a carbon nanofiber.

A solid or hollow, thin line-shaped or rod-shaped catalyst material, for example, is preferably adopted to efficiently perform diameter-reduction processing with high accuracy. In this situation, it is preferable to repeatedly perform the diameter-reduction processing to form a catalyst material having a diameter of a nanometer level, which is then cut to a desired length to form a solid or hollow columnar body having an intended height, and an end surface of the columnar body, that is, at least one cut surface thereof is preferably made to be a crystal growth surface. The shape of the crystal growth surface can be arbitrarily controlled by changing a cross-sectional shape of the catalyst material provided to diameter-reduction processing, and carbon nanostructures having various cross-sectional shapes can be produced. In the present invention, the diameter-reduction processing can be performed such that, an outside diameter of the catalyst material after the diameter-reduction processing becomes, for example, at most 1% of that before the diameter-reduction processing, especially within a range of $1\times10^{-6}$–1%. In this situation, the outside diameter of the catalyst material before the diameter-reduction processing is relatively large and a cross-sectional shape is easily designed. In addition, the catalyst material having the outside diameter of a nanometer level can be readily made by the diameter-reduction processing.

Though the catalyst base used in the present invention may be formed only with the catalyst material, a non-catalyst material which does not have a substantial catalytic function for growth of a carbon crystal is preferably formed on at least a portion of a side surface of the catalyst material which is formed as a columnar body having a crystal growth surface as an end surface. In this situation, spreading of the carbon crystal in a direction of the crystal growth surface is prevented by presence of the non-catalyst material, and a growth direction of the carbon crystal is controlled to enable production of a carbon nanostructure having a more even shape.

A material generally used as a catalyst in production of a carbon nanostructure can be used as the catalyst material. More specifically, a metal or an alloy including at least one member selected from Fe, Co, Mo, Ni, In, and Sn can be used. These materials can be used singly or in combination of at least two kinds. Among these, Fe, Co and Fe—Co alloy materials are suitable because they substantially do not form alloy or the like with Ag which is preferably used as the non-catalyst material as described below, and because they are catalysts which are not easily deteriorated.

The non-catalyst material may be any material which does not have a substantial catalytic function for growth of a carbon crystal. More specifically, a metal or an alloy including at least one member selected from Ag, Au, Ru, Rh, Pd, Os, Ir, and Pt is preferably used. Among these, Ag and an Ag-containing alloy are suitable because they are relatively inexpensive, can be processed easily, and are chemically stable. As the Ag-containing alloy, alloys such as Ag—Pd, Ag—Pt and Ag—Au alloys can be preferably used.

When a catalyst base formed with a composite body of the catalyst material and the non-catalyst material is used, the catalyst material and the non-catalyst material which substantially do not generate an alloy or cause a reaction when they contact each other and which have a low possibility of degrading a shape of the crystal growth surface are preferably used in combination. Such combination includes, for example, a combination of an oxide as the catalyst material and Ag or an Ag-containing alloy as the non-catalyst material, and a combination of a nitride as the catalyst material and Ag or an Ag-containing alloy as the non-catalyst material. In addition, a combination of the catalyst material formed with at least one member selected from Fe, Co, Mo, Ni, In, and Sn and the non-catalyst material formed with Ag and/or an Ag-containing alloy is also preferred.

The non-catalyst material preferably has a melting point higher than a generation temperature of the carbon nanostructure. In this situation, deformation of the non-catalyst material does not easily occur during crystal growth and a carbon nanostructure having an even shape can be generated.

In the present invention, a columnar catalyst base formed by arranging a plurality of columnar catalyst structures each formed with the catalyst material and the non-catalyst material, for example, can be preferably used to efficiently generate the carbon nanostructure. Production efficiency of the carbon nanostructure can be increased by using the catalyst base formed with a plurality of catalyst structures.

When the catalyst base is formed as a columnar aggregate including an arrangement of the plurality of catalyst structures each formed with the catalyst material and the non-catalyst material, it is preferable to further form the non-catalyst material on at least a portion of a side surface of the aggregate. In this situation, unevenness of a shape of the carbon nanostructure due to a generated carbon crystal spreading in a direction of the crystal growth surface is further suppressed by a contribution of the non-catalyst material formed on the side surface of the aggregate, in addition to a contribution of the non-catalyst material in each of the catalyst structures.

When the catalyst base is formed by arranging the plurality of catalyst structures each formed with the catalyst material and the non-catalyst material, the catalyst structures preferably have variations of at most CV 10% in surface areas of the catalyst material on the crystal growth surface. In this situation, evenness of a cross-sectional shape of the carbon nanostructure can be ensured with a sufficiently even shape of the crystal growth surface. A surface area of the catalyst material can be calculated by, for example, an image analysis based on a figure observation with an STM (scanning tunneling microscope).

A reinforcing material for suppressing deformation of the catalyst base may be formed in at least a portion of the catalyst base formed with the catalyst material and the non-catalyst material, preferably in at least a portion of a periphery of the catalyst base. In this situation, generation of a gap between the catalyst material and the non-catalyst material is suppressed by the reinforcing material and generation of carbon as an impurity from an interface between the catalyst material and the non-catalyst material is avoided, which can further increase evenness of the carbon nanostructure. As the reinforcing material, a material having a Young's modulus larger than that of the catalyst base formed with the catalyst material and the non-catalyst material in a condition of production of the carbon nanostructure is preferably used. In particular, a material having heat resistance higher than that of the non-catalyst material is preferably used. More specifically, a heat-resistant high-strength metal such as tungsten carbide, ceramics or Inconel, for example, is used.

A method which enables reduction of a diameter by plastic deformation of the catalyst material or the composite material of the catalyst material and the non-catalyst material can be adopted as a method of diameter-reduction processing in the present invention. More specifically, at least one processing selected from drawing, extrusion, rolling, and forging is preferred. When two or more of the processings are performed in combination, a method of thinning a material formed in a rod-like shape to a degree by rolling and then further reducing a diameter thereof by drawing or extrusion, or a method of embossing to apply a stress in a direction of a radius of a rod-shaped material by forging for thinning to a degree and then further reducing a diameter thereof by drawing or extrusion, for example, can be adopted. When the diameter-reduction processing is performed, it is preferable to select a processing condition as appropriate not to cause rapid plastic deformation in order to prevent deterioration of physical properties of the material.

A method of making the catalyst base used in the present invention will now be described referring to the drawing. FIG. 1 shows an example of a method of making the catalyst base used in the present invention. First, as shown in FIG. 1(A), a pipe-shaped non-catalyst material 12 is filled with a rod-shaped catalyst material 11 to obtain a composite material 13. Then, as shown in FIG. 1(B), composite material 13 is passed through a drawing dice 14 for drawing to cause diameter-reduction with plastic deformation of composite material 13, and is further used to fill a pipe-shaped non-catalyst material 15 to obtain a composite material 16, as shown in FIG. 1(C). As shown in FIG. 1(D), composite material 16 obtained is passed through drawing dice 14 again for diameter-reduction with plastic deformation. By repeating filling and diameter-reduction operations as described above, a columnar aggregate including an arrangement of a plurality of catalyst materials 11 each having a diameter of at most 10 nm, for example, is obtained. The aggregate is cut to a prescribed length and a cut surface thereof is polished to finally obtain a catalyst base 17 as shown in FIGS. 1(E) and 1(F) which is a columnar body formed with the plurality of catalyst materials 11, which columnar body has one end surface as a crystal growth surface and the other end surface as a non-crystal growth surface (herein, portions enclosed with dotted lines in FIGS. 1(E) and 1(F) indicate an identical region). On each of the crystal growth surface and the non-crystal growth surface of catalyst base 17 shown in FIG. 1(E), catalyst material 11 has a round shape. A catalyst material layer may be provided, for example, on the non-crystal growth surface of catalyst base 17. When the catalyst base having a construction as such is used and a material gas is brought into contact with the non-crystal growth surface, carbon of a high concentration dissolves in catalyst material 11 with a contribution of the catalyst material layer having a large surface area, and since carbon of the high concentration is supplied to the crystal growth surface, a speed of generation of the carbon nanostructure can be increased.

In the catalyst base used in the present invention, the catalyst material preferably has at least any of a round shape, a ring-like shape, a spiral shape, a polygonal shape, a waved shape, and a branching shape on the crystal growth surface. It is also preferable to form the catalyst material to have a multilayer structure on the crystal growth surface. In this situation, a shape of the crystal growth surface is reflected to a cross section of the carbon nanostructure generated, and a carbon nanostructure having a monolayer or multilayer spiral shape or ring-like shape, for example, can be arbitrarily generated. As a method of forming a multilayer structure or a ring structure on the crystal growth surface, a method of interposing the non-catalyst material between monolayer or multilayer catalyst materials by a method of alternately stacking the catalyst material and the non-catalyst material by a vapor phase method, or by a method of performing, once or at least two times, a step of filling the catalyst material or the non-catalyst material prepared to have a pipe-like shape with the catalyst material or the non-catalyst material prepared to have a rod-like shape, for example, can be preferably adopted. In the catalyst base shown in FIG. 1, though catalyst material 11 on the crystal growth surface has a round shape because rod-shaped catalyst material 11 is used, when the non-catalyst material is used in place of catalyst material 11 and the catalyst material is used in place of non-catalyst material 12, for example, a catalyst base having a ring-shaped crystal growth surface can be made.

Figure 2:
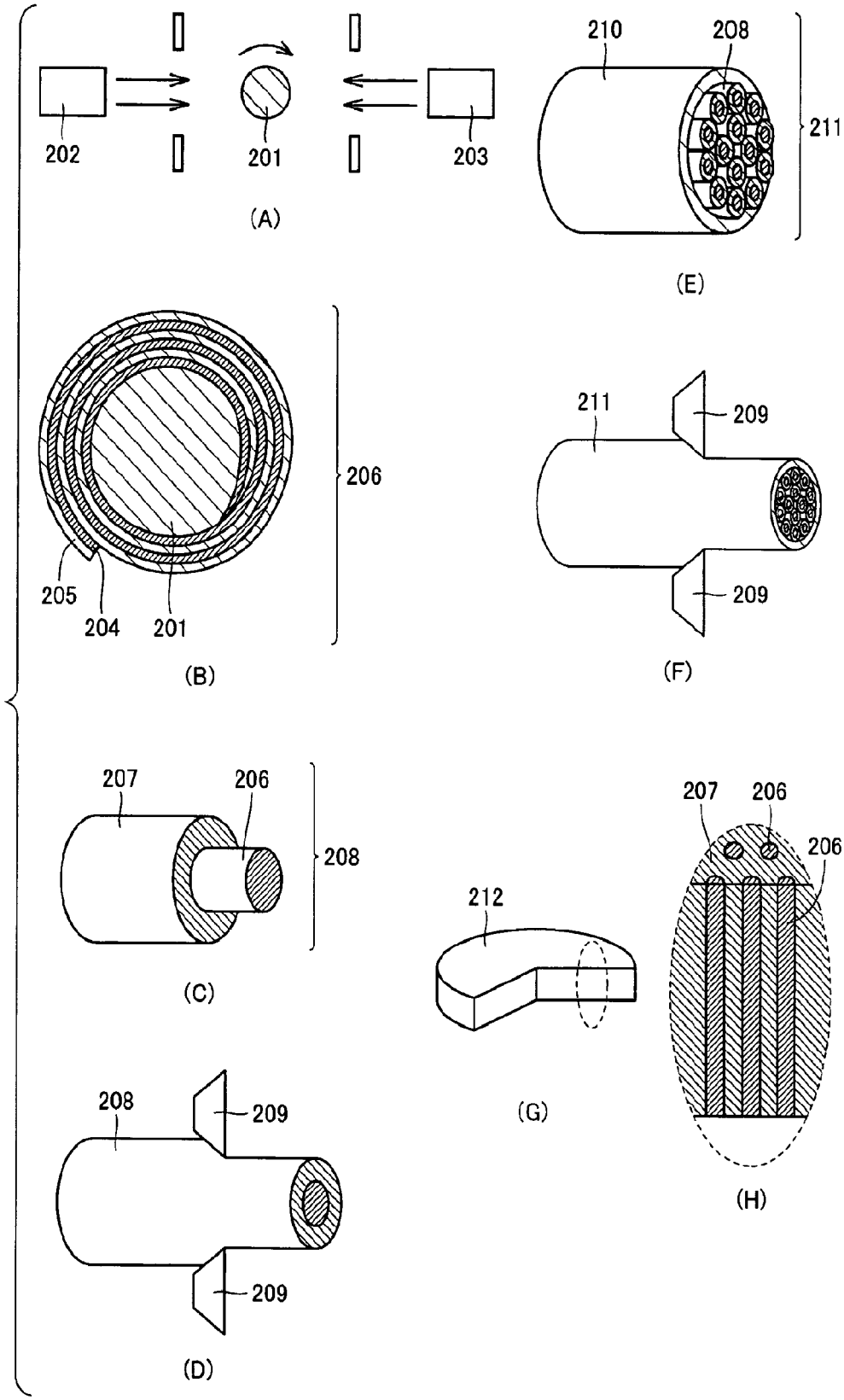
FIG. 2 shows an example of a method of making a catalyst base having a multilayer structure which is used in the present invention.

FIG. 2 shows an example of a method of making a catalyst base having a multilayer structure which is used in the present invention. As shown in FIG. 2(A), a non-catalyst material 201 is rotated in a direction of an arrow, and a non-catalyst material and a catalyst material are concurrently deposited on non-catalyst material 201 from a deposition source 202 for depositing the non-catalyst material and a deposition source 203 for depositing the catalyst material. With this, as shown in FIG. 2(B), a composite material 206 having a multilayer structure including a catalyst material 204 and a non-catalyst material 205 formed in a spiral shape on a periphery of non-catalyst material 201 is obtained. Then, as shown in FIG. 2(C), a pipe-shaped non-catalyst material 207 is filled with composite material 206 to obtain a composite material 208. As shown in FIG. 2(D), composite material 208 is passed through a drawing dice 209 to cause diameter-reduction with plastic deformation and, furthermore, a non-catalyst material 210 is filled with composite material 208 to obtain a composite material 211, as shown in FIG. 2(E). As shown in FIG. 2(F), composite material 211 is passed through drawing dice 209 to cause diameter-reduction with plastic deformation and, finally, a catalyst base 212 as shown in FIGS. 2(G) and 2(H) which is a columnar body formed with a plurality of composite materials 206 each having the catalyst material formed in a spiral shape can be made, which columnar body has one end surface as a crystal growth surface (herein, portions enclosed with dotted lines in FIGS. 2(G) and 2(H) indicate an identical region).

A number or thicknesses of layers of the multilayer structure can be readily controlled by controlling an amount of deposition of the catalyst material and/or the non-catalyst material, a rotation speed of non-catalyst material 201 or the like in a step shown in FIG. 2(A). In addition, a layered structure may be arbitrarily controlled by adjusting a deposition start time and/or a deposition end time of the catalyst material or the non-catalyst material from deposition sources 202 and 203. It is to be noted that, the catalyst material may be used in place of non-catalyst material 201 according to a desired structure of a carbon nanostructure. In this situation, the catalyst material on the crystal growth surface has a shape having a filled center portion.

Figure 3:
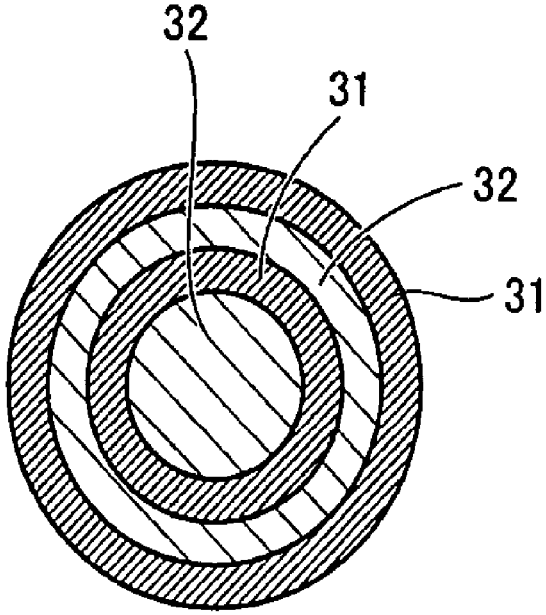
FIG. 3 is a cross-sectional view of a crystal growth surface of a catalyst base having a multilayer ring structure which is used in the present invention.
Figure 4:
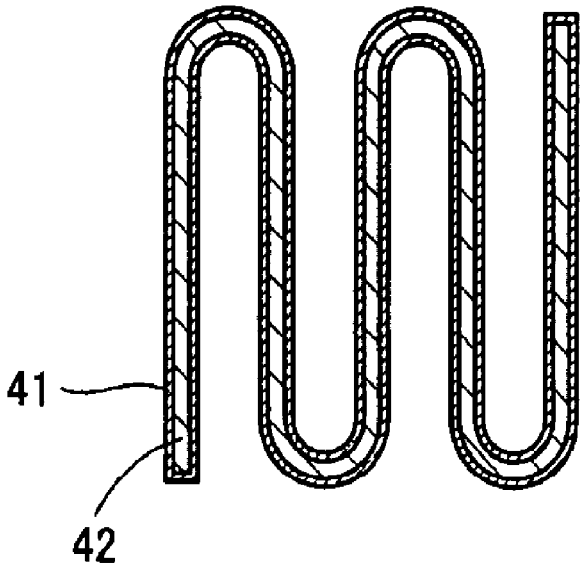
FIG. 4 is a cross-sectional view of a crystal growth surface of a catalyst base having a waved structure which is used in the present invention.

FIG. 3 is a cross-sectional view of a crystal growth surface of a catalyst base having a multilayer ring structure which is used in the present invention. In the catalyst base shown in FIG. 3, a catalyst material 31 and a non-catalyst material 32 are formed to have a layered structure and catalyst material 31 has a crystal growth surface of a multilayer ring-like shape. FIG. 4 is a cross-sectional view of a crystal growth surface of a catalyst base having a waved structure which is used in the present invention. In the catalyst base shown in FIG. 4, a catalyst material 41 is formed on a periphery of a non-catalyst material 42 and catalyst material 41 has a crystal growth surface of a waved ring-like shape.

When a rod-shaped and/or pipe-shaped catalyst material or composite material of the catalyst material and the non-catalyst material is used, it is preferable to cut the catalyst material or the composite material subjected to diameter-reduction processing to a desired length, and polish cut surfaces (end surfaces) thereof by, for example, ion milling or laser beam processing to obtain a columnar catalyst base having one of the end surfaces as a crystal growth surface and the other as a non-crystal growth surface.

Figure 5:
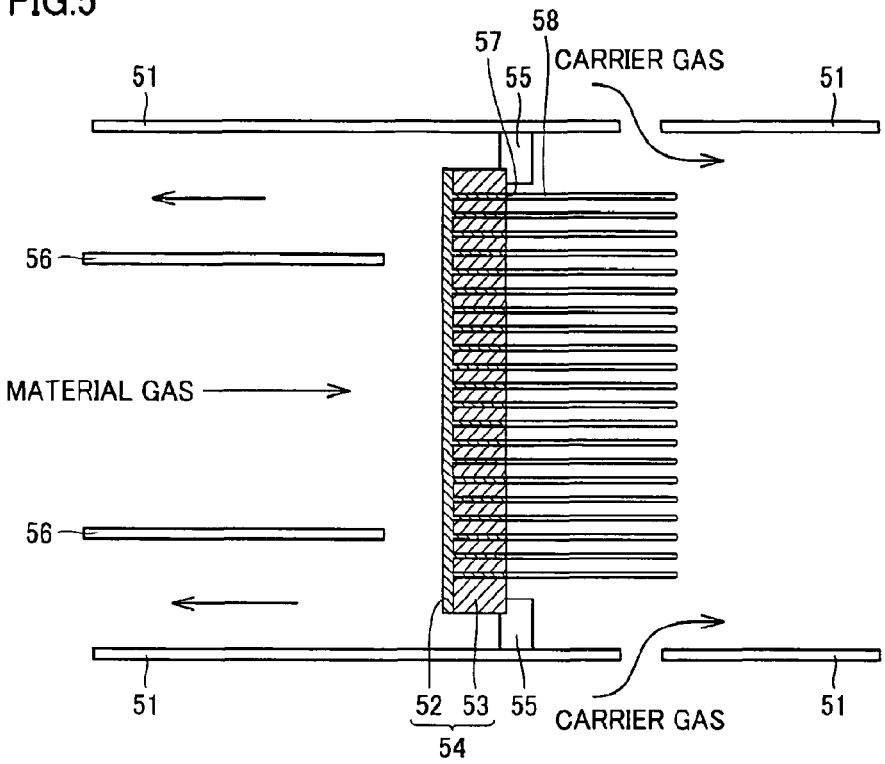
FIG. 5 shows an example of a production device of a carbon nanostructure.

When the catalyst base is formed as a columnar body, a thickness of the catalyst base, that is, a height of the columnar body is preferably set to, for example, about 1-1000 μm. The catalyst base is readily prepared when the thickness of the catalyst base is at least 1 μm, and carbon is stably supplied to the crystal growth surface even if a material gas is brought into contact with only the non-crystal growth surface when the thickness is at most 1000 μm. When the thickness of the catalyst base is relatively small, however, deformation of the catalyst base may occur depending on a production condition such as a condition of supply of an atmospheric gas. In this situation, it is preferable to affix a porous body formed with a non-catalyst material to the non-crystal growth surface of the catalyst base, supply a material gas from a side of the porous body, and grow a carbon crystal from the crystal growth surface. With this, deformation of the catalyst base can be prevented without decreasing an amount of supply of carbon into the catalyst material. Furthermore, it is preferable to reinforce the catalyst material by, for example, forming a film on the non-crystal growth surface, as shown in FIG. 5.

In the present invention, surface processing by mechanical polishing and/or sputtering is preferably performed beforehand for the crystal growth surface in order to increase evenness of a shape of a generated carbon nanostructure by cleaning and smoothing of the crystal growth surface. At least one kind selected from a plasma, an ion beam and a laser beam is preferably used in the sputtering since the crystal growth surface can be processed to be more smooth with high processing efficiency. Furthermore, a cluster ion beam and an ultrashort pulse laser are preferably used as the ion beam and the laser beam, respectively.

Furthermore, it is preferable to enter an ion in the crystal growth surface before and/or after the surface processing to resolve surface disorder of the crystal growth surface due to the mechanical polishing and/or sputtering. As a method of entering the ion, a method such as a cementation method or a plasma method, for example, can be adopted.

In addition, in order to further resolve the surface disorder of the crystal growth surface and define an interface between the catalyst material and the non-catalyst material, at least one processing selected from oxidation, nitriding and carbonization is preferably performed for the crystal growth surface. With this, generation of an impurity other than a desired carbon nanostructure can be suppressed and production efficiency of the carbon nanostructure can be increased. Oxidation, for example, can be performed by heat treatment in an oxygen atmosphere or the like.

Reactivation processing is preferably performed for the crystal growth surface after generation of the carbon nanostructure using at least one processing selected from, for example, chemical polishing, physical polishing and sputtering. The catalyst base can be reused by reactivation of the crystal growth surface, and a production cost can be reduced.

In the present invention, a gas generally used for producing a carbon nanostructure including a hydrocarbon-based gas such as a propane gas, an ethylene gas or an acetylene gas, an alcohol-based gas such as a methyl alcohol gas or an ethyl alcohol gas, or carbon monoxide can be used as a material gas for growing the carbon nanostructure. When a material having a relatively low deformation temperature is used as a material forming the catalyst base, for example, the alcohol-based gas is preferably used which enables generation of the carbon nanostructure at a lower temperature.

Since the carbon nanostructure generated may be degraded by a hydrogen gas or the like, a gas which does not substantially deteriorate the carbon crystal generated is preferably supplied as a carrier gas to a portion near the crystal growth surface. A preferable carrier gas includes, for example, an inert gas such as argon or nitrogen.

Though a condition of supply of a gas brought into contact with the catalyst base may be the same for the portion near the crystal growth surface and a portion near the non-crystal growth surface, the condition is preferably made different for each portion so that dissolving of carbon into the catalyst material and precipitation of the carbon crystal are controlled to occur in separate regions of a surface of the catalyst base. When a material gas is brought into contact with the portion near the non-crystal growth surface and a carrier gas not including a carbon source is brought into contact with the portion near the crystal growth surface, for example, only carbon which is supplied from the non-crystal growth surface, moves inside the catalyst base and reaches the crystal growth surface is supplied to the crystal growth surface. Therefore, generation of an impurity, which is readily generated when carbon exists in an atmospheric gas near the crystal growth surface, can be suppressed and the carbon nanostructure with a higher purity can be generated. Besides, high production efficiency can be attained because carbon of a high concentration is always supplied to the crystal growth surface. In this situation, since the material gas is not supplied to the portion near the crystal growth surface and a pressure due to entering of carbon is not applied to the crystal growth surface from a surface toward an internal portion of the catalyst material, carbon is supersaturated in the portion near the crystal growth surface and can precipitate as a carbon crystal.

Though only one kind of material gas or a combination of two kinds of gases, that is, a material gas and a carrier gas, for example, can be adopted as a gas used in the present invention, gases of at least three kinds may be combined and used. More specifically, a combination for bringing a material gas into contact with the catalyst material in a region other than that near the crystal growth surface, supplying a first carrier gas for accelerating growth of the carbon nanostructure to the portion near the crystal growth surface, and further supplying a second carrier gas for moving the carbon nanostructure generated, or a combination of a gas for suppressing precipitation of carbon from a material gas itself or from a contact region between the catalyst base and the material gas and the material gas, for example, can be adopted.

In addition, when at least two kinds of atmospheric gases are supplied, the atmospheric gases can be supplied to contact the catalyst base with different pressures. In this situation, a growth speed of the carbon nanostructure or a structure such as a number of layers in the generated carbon nanostructure can be controlled with a difference in pressures of the atmospheric gases.

Particularly, setting of a pressure of an atmospheric gas in a contact region between the catalyst base and the material gas to be higher than a pressure of an atmospheric gas near the crystal growth surface is preferable because carbon generated by thermal decomposition of the material gas is absorbed into the catalyst material more efficiently.

In addition, at least one kind of the atmospheric gases is preferably supplied to contact the catalyst base with a pressure of at least an atmospheric pressure. When the material gas contacts the catalyst base with the pressure of at least the atmospheric pressure, carbon is absorbed into the catalyst material more efficiently. In addition, deformation of the catalyst base can be suppressed by setting a pressure of the atmospheric gas near the crystal growth surface to be equal to a pressure of the atmospheric gas on a side of supply of the material gas.

It is also preferable to set a surface area of the catalyst material contacting the material gas on a surface of the catalyst base to be larger than a surface area of the crystal growth surface. In this situation, production efficiency of the carbon nanostructure is increased because carbon of a higher concentration which is generated by thermal decomposition of the material gas is supplied to the crystal growth surface.

In the present invention, a reducing gas is preferably brought into contact with at least the crystal growth surface of the catalyst material before or during growth of the carbon crystal. The crystal growth surface of the catalyst material may be oxidized during the steps of making the catalyst base, surface-processing the crystal growth surface, and the like. With contacting the reducing gas, a metal oxide layer on the crystal growth surface can be removed and the carbon nanostructure can be generated in a more even shape. As a method of contacting the reducing gas, for example, a method of supplying an atmospheric gas including a hydrogen gas or the like to bring the atmospheric gas into contact with the crystal growth surface can be adopted.

Though a temperature for generating the carbon nanostructure in the present invention is not specifically limited and can be selected as required according to properties of an applied catalyst base, a kind of a material gas or the like, the temperature can be set to, for example, about 500-960° C. Depending on a production condition, however, the catalyst material may be deformed or may be deteriorated by an impurity attached to a surface of the catalyst material, which forms an alloy or a compound of the catalyst material and decreases a catalyst activity. Since reliable growth of the carbon nanostructure having a desired shape becomes difficult when the crystal growth surface of the catalyst material is deformed or deteriorated, the temperature for generating the carbon nanostructure is preferably set to at most a temperature which does not cause deformation or deterioration of the catalyst base. When the catalyst material including Fe is used, for example, the temperature for generating the carbon nanostructure is preferably set to at least an $A_1$ transformation temperature of Fe (iron) (for example, 723° C. which is an $A_1$ transformation temperature of pure iron), especially to at least 850° C.

A method of producing a carbon nanostructure according to the present invention preferably includes the steps of supplying carbon from a side of the non-crystal growth surface of the catalyst base to set at least a portion of carbon in the catalyst material to a saturated state, and growing a carbon crystal from the crystal growth surface. In this situation, since the carbon crystal is grown with carbon of a high concentration supplied to the crystal growth surface, evenness of a shape of the carbon nanostructure obtained and production efficiency can be increased. More specifically, a method including a step of setting a temperature near the crystal growth surface to be higher than a temperature for generating the carbon crystal while bringing a material gas into contact with the non-crystal growth surface to supply carbon into the catalyst base to set carbon in the catalyst material to a saturated state, and a subsequent step of decreasing the temperature near the crystal growth surface to be at most the temperature for generating the carbon crystal to grow the carbon crystal from the crystal growth surface, for example, can be preferably adopted. The temperature near the crystal growth surface can be controlled by, for example, providing a heat source near the crystal growth surface.

The method of producing a carbon nanostructure in the present invention will now be described. FIG. 5 shows an example of a production device of a carbon nanostructure. In a heat and pressure-resistant heating furnace tube 51 including an electric furnace as a heating device, a gas introduction and exhaust system, a growth temperature control system, a vacuum control system, a gas flowmeter, and the like, a catalyst base 54 formed with a catalyst material 52 and a non-catalyst material 53 is inserted, and catalyst base 54 is fixed to heat and pressure-resistant heating furnace tube 51 with a seal material 55 filling a gap therebetween. Heat and pressure-resistant heating furnace tube 51 is separated into a space of a crystal growth surface side and a space of a non-crystal growth surface side with catalyst base 54 and seal material 55. In the space of the non-crystal growth surface side, a diaphragm 56, for example, is provided to supply a material gas so as to flow in a direction of an arrow. A carrier gas is supplied to the space of the crystal growth surface side. Carbon generated by thermal decomposition of the material gas supplied to the space of the non-crystal growth surface side moves inside catalyst material 52 in catalyst base 54, reaches a crystal growth surface 57 and precipitates from crystal growth surface 57 as a carbon crystal to grow a carbon nanostructure 58.

Figure 6:
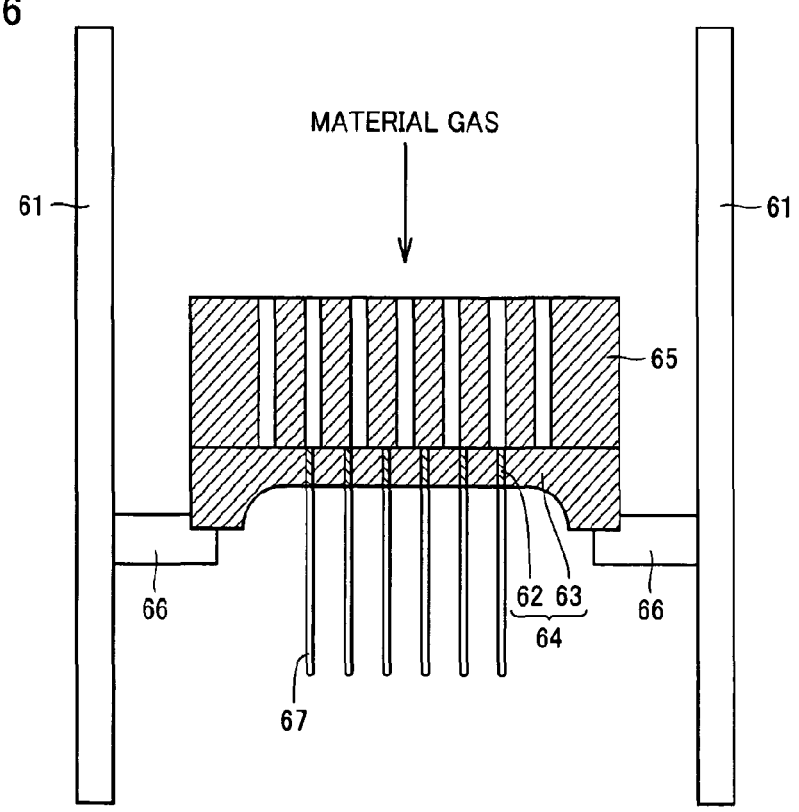
FIG. 6 shows an example of a construction of a catalyst base used in the present invention.

FIG. 6 shows an example of a construction of a catalyst base used in the present invention. In a heat and pressure-resistant heating furnace tube 61 including an electric furnace as a heating device, a gas introduction and exhaust system, a growth temperature control system, a vacuum control system, a gas flowmeter, and the like, a catalyst base 64 formed with a catalyst material 62 and a non-catalyst material 63 is inserted. A porous body 65 formed with a non-catalyst material is formed to contact a non-crystal growth surface side of catalyst base 64, and catalyst base 64 is fixed to heat and pressure-resistant heating furnace tube 61 with a seal material 66. Heat and pressure-resistant heating furnace tube 61 is separated into a space of a crystal growth surface side and a space of the non-crystal growth surface side with catalyst base 64 and seal material 66 filling a gap. A material gas is supplied to the space of the non-crystal growth surface side in a flow in a direction of an arrow, and carbon generated by thermal decomposition of the material gas passes through a pore portion of porous body 65, moves inside catalyst material 62 in catalyst base 64, reaches a crystal growth surface and precipitates as a carbon crystal to grow a carbon nanostructure 67.

In the present invention, it is also preferable to ionize a material gas containing carbon and bring it into contact with the catalyst material in order to generate the carbon nanostructure more efficiently. By ionizing the material gas and accelerating ionized carbon with an electric field to allow collision thereof with the catalyst material, solubility of carbon to the catalyst material can be increased and carbon can penetrate to a deeper region of the catalyst material from a contact surface between the material gas and the catalyst material. With this, carbon of a high concentration is supplied to the crystal growth surface and production efficiency of the carbon nanostructure can be increased. Plasma cementation, for example, can be adopted as a method of ionizing the material gas and bringing it into contact with the catalyst material. For the plasma cementation, for example, a method of applying a voltage between a furnace tube supplied with a material gas formed with a gas such as a mixed gas of a gas containing a carbon source and a carrier gas and the catalyst base to cause glow discharge and generating plasma of the material gas to ionize the material gas can be adopted.

Figure 7:
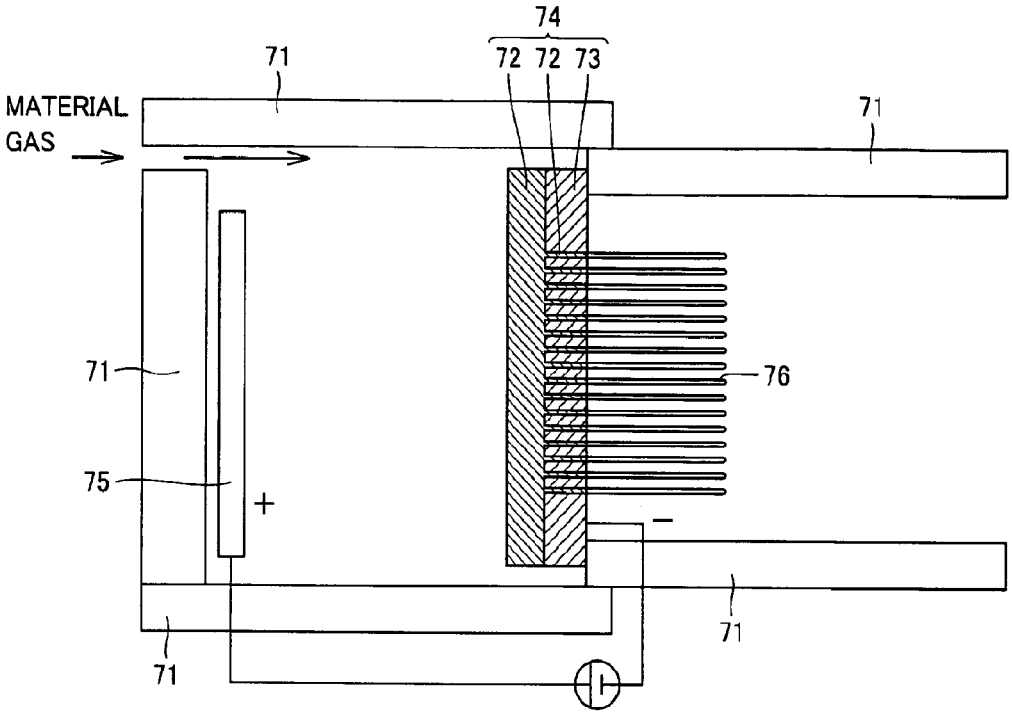
FIG. 7 shows an example of a production device of a carbon nanostructure which includes a plasma cementation device.

FIG. 7 shows an example of a production device of a carbon nanostructure which includes a plasma cementation device. In the production device formed with a heat and pressure-resistant heating furnace tube 71 including an electric furnace as a heating device, a gas introduction and exhaust system, a growth temperature control system, a vacuum control system, a gas flowmeter, and the like, a catalyst base 74 formed with a catalyst material 72 and a non-catalyst material 73 is inserted, and a space formed with heat and pressure-resistant heating furnace tube 71 is separated into a space of a crystal growth surface side and a space of a non-crystal growth surface side with catalyst base 74. An anode 75 is arranged on the non-crystal growth surface side. As an example, a mixed gas including a propane gas, a methane gas, an ethylene gas, a hydrogen gas, an argon gas, or the like is supplied as a material gas to the space of the non-crystal growth surface side, catalyst base 74 is used as a cathode to apply a voltage between anode 75 and catalyst base 74 to generate plasma with glow discharge, and carbon generated by decomposition of the material gas is supplied in an ionized state to the non-crystal growth surface.

The production device of a carbon nanostructure used in the present invention may have a construction provided with, for example, a supply mechanism for a purified gas to enable purification of a material gas containing a decomposed gas or the like after generation of the carbon nanostructure. In addition, it is preferable to electrify the carbon nanostructure generated in the present invention and collect it with force of static electricity or the like.

The carbon nanostructure produced with the method of the present invention has an even shape and is highly pure, which can be suitably applied to various uses such as an electronic circuit, a high-strength composite material, an electric wire material, and a cushion material.

EXAMPLES

Though the present invention will be described in more detail with examples, the present invention is not limited thereto.

Example 1

(1) Making of Catalyst Base

In this example, a catalyst base was made by a method indicated in FIG. 1. Composite material 13 (FIG. 1(A)), which was obtained by inserting an Fe (iron) rod as catalyst material 11 having an outside diameter of 40 mm into an Ag (silver) pipe as non-catalyst material 12 having an outside diameter of 60 mm and an inside diameter of 40 mm, was subjected to wiredrawing with drawing dice 14 until an outside diameter thereof became 1.2 mm to obtain a wire 1 (FIG. 1(B)). Wire 1 was cut at every length of 1 m and bundled together to fill an Ag pipe as non-catalyst material 15 having an outside diameter of 60 mm and an inside diameter of 40 mm, while spacers of Ag were used to fill gaps to avoid generation of a cavity, to form composite material 16 (FIG. 1(C)). Composite material 16 was passed through drawing dice 14 for wiredrawing until a diameter thereof became 1.2 mm to obtain a wire 2 (FIG. 1(D)). The step of obtaining wire 2 from wire 1 was repeated and, finally, an aggregate having a diameter of 30 mm was obtained which was formed with a bundle of a plurality of catalyst structures each formed with the catalyst material and the non-catalyst material, in which an outside diameter of Fe was set to 3 nm. The aggregate was cut to have a length of 1 mm, and cut surfaces of both ends (both end surfaces) were polished by buffing.

Lateral sputtering of the both end surfaces was performed using a cluster ion beam so that a structure of an Fe portion as the catalyst material was exposed on the both end surfaces in a round shape to make catalyst base 17 having a large number of Fe portions as catalyst materials 11 arranged in Ag portions as non-catalyst materials 12 (FIG. 1(E)).

A crystal growth surface within a range of 0.1 μm square randomly selected from the catalyst base formed was observed with a scanning electron microscope to calculate a cross-sectional area of the catalyst material in each catalyst structure, and variations in cross-sectional areas in the catalyst structures were obtained with the following expression.

$$CV(\%)=\text{standard deviation of all measured values}/\text{average value of all measured values}\times 100$$

As a result, the variations in the cross-sectional areas of the catalyst materials on the crystal growth surface was at most 5% in CV (%).

(2) Production of Carbon Nanostructure

A carbon nanotube as a carbon nanostructure was produced using the catalyst base obtained as above. The catalyst base formed with the catalyst material and the non-catalyst material was inserted into a heat and pressure-resistant heating furnace tube including an electric furnace as a heating device, a gas introduction and exhaust system, a growth temperature control system, a vacuum control system, a gas flowmeter, and the like. While flowing an argon gas in the heat and pressure-resistant heating furnace tube, a temperature inside the heat and pressure-resistant heating furnace tube was set to 850° C. After leaving for 1 hour with flowing an ethanol gas, the temperature was further gradually decreased to 500° C., and then supply of the ethanol gas was stopped, which was followed by cooling to a room temperature.

As a result, generation of fibrous carbon from the crystal growth surface was recognized. When the catalyst base and the generated fibrous carbon were observed with the scanning electron microscope, it was ensured that the fibrous carbon was growing from the crystal growth surface of the catalyst material. When the fibrous carbon was further observed with a transmission electron microscope, it was ensured that the fibrous carbon was a carbon nanotube and an impurity such as amorphous carbon, graphite or the catalyst material was hardly included.

After observation with the electron microscope, the catalyst base was entered into the heat and pressure-resistant heating furnace tube and an attempt was made to generate the carbon nanotube again in a condition similar to that described above, but the carbon nanotube was not generated due to contamination of a surface of the catalyst base and the like. Therefore, sputtering of the crystal growth surface with an excimer laser was performed and, thereafter, an attempt was made to generate the carbon nanotube again in the condition similar to that described above. As a result, the carbon nanotube could be generated.

Example 2

(1) Making of Catalyst Base

In an Ag (silver) pipe having an outside diameter of 60 mm and an inside diameter of 50 mm, an Fe (iron) pipe having an outside diameter of 50 mm and an inside diameter of 45 mm was inserted, ard an Ag rod having an outside diameter of 45 mm was further inserted therein. A composite metal material obtained was subjected to wiredrawing with a drawing dice until an outside diameter thereof became 1.2 mm to obtain wire 1. Wire 1 was cut at every length of 1 m and bundled together to fill an Ag pipe having an outside diameter of 60 mm and an inside diameter of 40 mm, while spacers of Ag were used to fill gaps to avoid generation of a cavity, and the Ag pipe was subjected to wiredrawing with the drawing dice until a diameter thereof became 1.2 mm to obtain wire 2. The step of obtaining wire 2 from wire 1 was repeated and, finally, an aggregate having a diameter of 30 mm was obtained which was formed with a bundle of a plurality of catalyst structures in which an outside diameter of Fe was set to 7 nm. The aggregate was cut to have a length of 0.2 mm, and cut surfaces of both ends (both end surfaces) were mechanically polished by buffing or the like.

Thereafter, a carbon ion is injected into a polished surface using an ion implantation device. Planarization of the both end surfaces was performed using an excimer laser and a cluster ion beam so that a structure of an Fe portion as the catalyst material was exposed on the both end surfaces in a ring-like shape. Then, an Fe film having a thickness of 1 μm was formed on one end surface of the aggregate to make a catalyst base having the end surface on a side having the Fe film formed as a non-crystal growth surface and the end surface on a side not having the Fe film formed as a crystal growth surface.

(2) Production of Carbon Nanostructure

A carbon nanotube as a carbon nanostructure was produced with the production device shown in FIG. 5 using the catalyst base obtained as above. Heat and pressure-resistant heating furnace tube 51 including the electric furnace as the heating device, the gas introduction and exhaust system, the growth temperature control system, the vacuum control system, the gas flowmeter, and the like was separated into a space of a crystal growth surface side and a space of a non-crystal growth surface side with catalyst base 54 inserted and seal material 55. While flowing a mixed atmospheric gas containing an acetylene gas and an argon gas in a ratio of 1:4 at 1.5 atm in the space of the non-crystal growth surface side, a temperature inside heat and pressure-resistant heating furnace tube 51 was set to 960° C. On the other hand, an argon gas as a carrier gas was supplied to the crystal growth surface side. Thereafter, a ratio of supply of an acetylene gas was gradually decreased to zero while keeping a pressure of the atmospheric gas.

As a result, generation of fibrous carbon from the crystal growth surface was recognized. When catalyst base 54 and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

After observation with the electron microscope, the catalyst base was entered into heat and pressure-resistant heating furnace tube 51 and an attempt was made to generate the carbon nanotube again in a condition similar to that described above, but the carbon nanotube was not generated due to contamination of a surface of the catalyst base and the like. Therefore, sputtering of the crystal growth surface with a cluster ion beam was performed and, thereafter, an attempt was made to generate the carbon nanotube again in the condition similar to that described above. As a result, the carbon nanotube could be generated.

Example 3

(1) Making of Catalyst Base

In this example, a catalyst base was made by a method shown in FIG. 2. That is, while rotating an Ag rod as non-catalyst material 201 having an outside diameter of 40 mm, Fe and Ag were concurrently deposited on a periphery of the Ag rod from deposition sources 202 and 203 (FIG. 2(A)) to form composite material 206 in a spiral shape having respective 10 layers of Fe as catalyst materials 204 each having a thickness of 1 μm and Ag layers as non-catalyst materials 205 each having a thickness of 5 μm (FIG. 2(B)). An Ag layer as non-catalyst material 207 was further formed to make an outside diameter of a periphery of a resulting composite material 208 become 60 mm (FIG. 2(C)).

Composite material 208 obtained was passed through drawing dice 209 for wiredrawing until an outside diameter thereof became 1.2 mm to obtain wire 1 (FIG. 2(D)). Wire 1 was cut at every length of 1 m and bundled together to fill an Ag pipe as non-catalyst material 210 having an outside diameter of 60 mm and an inside diameter of 40 mm, while spacers of Ag were used to fill gaps to avoid generation of a cavity, to form composite material 211 (FIG. 2(E)). Composite material 211 obtained was passed through drawing dice 209 for wiredrawing until a diameter thereof became 1.2 mm to obtain wire 2 (FIG. 2(F)). The step of obtaining wire 2 from wire 1 was repeated and, finally, an aggregate having a diameter of 10 mm was obtained which was formed with a bundle of a plurality of catalyst structures in which a thickness of each of Fe layers was set to 2 nm. The aggregate was cut to have a length of 0.5 mm, and cut surfaces of both ends (both end surfaces) were mechanically polished by buffing or the like.

Planarization of the both end surfaces was performed using a cluster ion beam so that a structure of an Fe portion as the catalyst material was exposed on the both end surfaces in a spiral shape to make catalyst base 212 having a large number of composite materials 206 each having the catalyst material included in non-catalyst material 207 (FIG. 2(G)).

(2) Production of Carbon Nanostructure

A carbon nanotube as a carbon nanostructure was produced with the production device shown in FIG. 5 using the catalyst base obtained as above. Heat and pressure-resistant heating furnace tube 51 including the electric furnace as the heating device, the gas introduction and exhaust system, the growth temperature control system, the vacuum control system, the gas flowmeter, and the like was separated into a space of a crystal growth surface side and a space of a non-crystal growth surface side with catalyst base 54 inserted and seal material 55. While supplying an acetylene gas together with an argon gas to the space of the non-crystal growth surface side, a temperature inside heat and pressure-resistant heating furnace tube 51 was set to 840° C. On the other hand, an argon gas as a carrier gas was supplied to the space of the crystal growth surface side.

As a result, generation of fibrous carbon from the crystal growth surface was recognized. When catalyst base 54 and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

After observation with the electron microscope, catalyst base 54 was entered into heat and pressure-resistant heating furnace tube 51 and an attempt was made to generate the carbon nanotube again in a condition similar to that described above, but the carbon nanotube was not generated due to contamination of a surface of the catalyst base and the like. Therefore, sputtering of the surface of the catalyst base with a cluster ion beam was performed and, thereafter, an attempt was made to generate the carbon nanotube again in the condition similar to that described above. As a result, the carbon nanotube could be generated.

Example 4

(1) Making of Catalyst Base

In an Ag—Au (silver-gold) alloy pipe having an outside diameter of 60 mm and an inside diameter of 50 mm, an Fe (iron) pipe having an outside diameter of 50 mm and an inside diameter of 45 mm was inserted, and an Ag—Au alloy rod having an outside diameter of 45 mm was further inserted therein. A composite material obtained was subjected to wiredrawing with a drawing dice until an outside diameter thereof became 1.2 mm to obtain wire 1. Wire 1 was cut at every length of 1 m and bundled together to fill an Ag—Au pipe having an outside diameter of 60 mm and an inside diameter of 40 mm, while spacers of an Ag—Au alloy were used to fill gaps to avoid generation of a cavity, and the Ag—Au pipe was subjected to wiredrawing with the drawing dice until a diameter thereof became 1.2 mm to obtain wire 2. The step of obtaining wire 2 from wire 1 was repeated and, finally, an aggregate having a diameter of 5 mm was obtained which was formed with a bundle of a plurality of catalyst structures in which an outside diameter of Fe was set to 20 nm. The aggregate was cut to have a length of 2 mm, and cut surfaces of both ends (both end surfaces) were mechanically polished by buffing or the like.

Planarization of the both end surfaces was performed using a cluster ion beam or the like so that an Fe portion as the catalyst material was exposed on the both end surfaces in a ring-like shape. Then, an Fe film having a thickness of 2 μm was formed on one end surface to make a catalyst base having the end surface on a side having the Fe film formed as a non-crystal growth surface and the end surface on a side not having the Fe film formed as a crystal growth surface.

(2) Production of Carbon Nanostructure

A carbon nanotube as a carbon nanostructure was produced with the production device shown in FIG. 5 using the catalyst base obtained as above. Heat and pressure-resistant heating furnace tube 51 including the electric firnace as the heating device, the gas introduction and exhaust system, the growth temperature control system, the vacuum control system, the gas flowmeter, and the like was separated into a space of a crystal growth surface side and a space of a non-crystal growth surface side with catalyst base 54 inserted and seal material 55. While flowing a mixed atmospheric gas containing a propane gas and an argon gas in a ratio of 1:4 at 1.5 atm in the space of the non-crystal growth surface side, a temperature inside heat and pressure-resistant heating furnace tube 51 was set to 960° C. On the other hand, an argon gas as a carrier gas was supplied to the crystal growth surface side. Thereafter, a ratio of supply of an acetylene gas was gradually decreased to zero while keeping a pressure of the atmospheric gas.

As a result, generation of fibrous carbon from the crystal growth surface was recognized. When catalyst base 54 and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

After observation with the electron microscope, catalyst base 54 was entered into heat and pressure-resistant heating furnace tube 51 and an attempt was made to generate the carbon nanotube again in a condition similar to that described above, but the carbon nanotube was not generated due to contamination of a surface of the catalyst base and the like. Therefore, sputtering of the surface of the catalyst base with a cluster ion beam was performed and, thereafter, an attempt was made to generate the carbon nanotube again in the condition similar to that described above. As a result, the carbon nanotube could be generated.

Example 5

(1) Making of Catalyst Base

In an Ag (silver) pipe having an outside diameter of 60 mm and an inside diameter of 50 mm, an Fe (iron) pipe having an outside diameter of 50 mm and an inside diameter of 45 mm was inserted, and an Ag rod having an outside diameter of 45 mm was further inserted therein. A composite metal material obtained was subjected to wiredrawing with a drawing dice until an outside diameter thereof became 1.2 mm to obtain wire 1. Wire 1 was cut at every length of 1 m and bundled together to fill an Ag pipe having an outside diameter of 60 mm and an inside diameter of 40 mm, while spacers of Ag were used to fill gaps to avoid generation of a cavity, and the Ag pipe was subjected to wiredrawing with the drawing dice until a diameter thereof became 1.2 mm to obtain wire 2. The step of obtaining wire 2 from wire 1 was repeated and, finally, an aggregate having a diameter of 5 mm was obtained which was formed with a bundle of a plurality of catalyst structures in which an outside diameter of Fe was set to 12 nm. The aggregate was cut, and cut surfaces of both ends (both end surfaces) were mechanically polished by buffing or the like to obtain a thickness of 1 mm.

Planarization of the both end surfaces was performed using a cluster ion beam or the like so that a structure of an Fe portion as the catalyst material was exposed on the both end surfaces in a ring-like shape. Thereafter, a porous body made of Ag having a thickness of 3 mm and including a large number of pores of about 80 μmφ was subjected to pressure welding to one end surface of a catalyst base to be a non-crystal growth surface, and was joined by heating or the like. Furthermore, irradiation with an ion beam or the like was performed for the other end surface to be a crystal growth surface, and the catalyst base was made to be a thin film until a length between the both end surfaces, that is, a thickness of the catalyst base became 80 μm. Finally, planarization of the crystal growth surface with a cluster ion beam was performed to remove surface roughness on the crystal growth surface of the catalyst material, and making of the catalyst base was completed.

(2) Production of Carbon Nanostructure

A carbon nanotube as a carbon nanostructure was produced using the production device shown in FIG. 5 and the catalyst base obtained as above. Heat and pressure-resistant heating furnace tube 51 including the electric furnace as the heating device, the gas introduction and exhaust system, the growth temperature control system, the vacuum control system, the gas flowmeter, a plasma cementation device, and the like was separated into a space of a crystal growth surface side and a space of a non-crystal growth surface side with catalyst base 54 inserted and seal material 55. A material gas including an ethylene gas and a hydrogen gas mixed in a ratio of 1:2 was introduced into the space of the non-crystal growth surface side to be about 3 Torr (about 399 Pa) at 880° C. Heat and pressure-resistant heating furnace tube 51 was used as an anode and the catalyst base was used as a cathode to apply a DC voltage between both electrodes to cause glow discharge and generate plasma, and thereby carbon penetrated from the non-crystal growth surface into the catalyst material. On the other hand, a mixed gas of an argon gas and an $H_2$ gas was introduced to the crystal growth surface side and, thereafter, supply of only the $H_2$ gas was stopped.

As a result, generation of fibrous carbon from the crystal growth surface was recognized. When catalyst base 54 and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

Example 6

(1) Making of Catalyst Base

In this example, a catalyst base having the construction shown in FIG. 6 was used. In an Ag (silver) pipe having an outside diameter of 36 mm and an inside diameter of 9 mm, an Fe (iron) pipe (an Fe purity: about 4 N (99.99%)) having an outside diameter of 9 mm and an inside diameter of 7 mm was inserted, and an Ag rod having an outside diameter of 7 mm was further inserted therein. A composite material obtained was subjected to wiredrawing with a drawing dice until an outside diameter thereof became 2 mm to obtain wire 1. Wire 1 was cut at every length of 1 m and bundled together to fill an Ag pipe having an outside diameter of 36 mm and an inside diameter of 9 mm, while spacers of Ag were used to fill gaps to avoid generation of a cavity, and the Ag pipe was subjected to wiredrawing with the drawing dice until a diameter thereof became about 1.2 mm to obtain wire 2. The step of obtaining wire 2 from wire 1 was repeated to finally obtain an aggregate formed with a composite material having Fe penetrating through an Ag base material having a diameter of 20 mm which was formed with a bundle of a plurality of catalyst structures in which an outside diameter of Fe was set to 8 nm.

The aggregate was cut, and cut surfaces of both ends (both end surfaces) were polished by buffing or the like to have a thickness of 50 μm.

Planarization of one end surface was performed using a cluster ion beam or the like so as to expose a structure of an Fe portion as the catalyst material to form a non-crystal growth surface exposing the catalyst material in a ring-like shape. Thereafter, porous body 65 made of Ag having a thickness of 3 mm, which included holes of about 200 μmϕ to form a lotus root-like shape, was subjected to pressure welding to the non-crystal growth surface of catalyst base 64, joined by heating or the like, and further reinforced with a base material made of WC (tungsten carbide). Finally, planarization of a crystal growth surface was performed using a cluster ion beam so as to expose the catalyst material in a ring-like shape to make catalyst base 64 having porous body 65 formed thereon.

(2) Production of Carbon Nanostructure

A carbon nanotube as a carbon nanostructure was produced using the production device shown in FIG. 6 and the catalyst base obtained as above. Heat and pressure-resistant heating furnace tube 61 including the heating device, the gas introduction and exhaust system, the growth temperature control system, the vacuum control system, the gas flowmeter, a plasma cementation device, and the like was separated into a space of a non-crystal growth surface side and a space of a crystal growth surface side with catalyst base 64 inserted and seal material 66.

A material gas including a hydrogen gas, a methane gas and an argon gas mixed in a ratio of 2:1:2 was used to fill the space of the non-crystal growth surface side to attain about 4 Torr (about 532 Pa) at 860° C. The heat and pressure-resistant heating furnace tube was used as an anode and the catalyst base was used as a cathode to apply a DC voltage between both electrodes to cause glow discharge and generate plasma, and thereby carbon penetrated from the non-crystal growth surface side into catalyst material 62 via porous body 65. A carrier gas including a hydrogen gas and an argon gas was used to fill the space of the crystal growth surface side and, after the carbon nanotube as carbon nanostructure 67 was generated, supply of the hydrogen gas was stopped to supply only the argon gas to the space of the crystal growth surface side.

As a result, generation of fibrous carbon from the crystal growth surface was recognized. When the catalyst base and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

In this example, during generation of the carbon nanotube, the hydrogen gas was supplied to the non-crystal growth surface and the crystal growth surface to reduce an iron oxide layer on an exposed surface of the catalyst material to accelerate penetration of carbon into the catalyst material and precipitation of a carbon crystal from the crystal growth surface.

Example 7

(1) Making of Catalyst Base

In an Ag (silver) pipe having an outside diameter of 36 mm and an inside diameter of 18 mm, an Fe (iron) pipe (an Fe purity: at least about 5 N (99.999%)) having an outside diameter of 18 mm and an inside diameter of 14 mm was inserted, and an Ag rod having an outside diameter of 14 mm was further inserted therein. A composite material obtained was subjected to wiredrawing with a drawing dice until an outside diameter thereof became 2 mm to obtain wire 1. Wire 1 was cut at every length of 1 m and bundled together to fill an Ag pipe having an outside diameter of 36 mm and an inside diameter of 18 mm, while spacers of Ag were used to fill gaps to avoid generation of a cavity, and the Ag pipe was subjected to wiredrawing with the drawing dice until a diameter thereof became 2 mm to obtain wire 2. The step of obtaining wire 2 from wire 1 was repeated to finally obtain an aggregate formed with a composite material having Fe penetrating through an Ag base material having a diameter of 20 mm which was formed with a bundle of a plurality of catalyst structures in which an outside diameter of Fe was set to about 8 nm.

The aggregate was cut, and cut surfaces of both ends (both end surfaces) were polished by buffing or the like to have a thickness of about 40 μm. Thereafter, a cluster ion beam or the like was used to perform planarization of a non-crystal growth surface so as to expose the catalyst material in a ring-like shape, and an Fe film having a thickness of about 5 μm was further formed on the non-crystal growth surface. The end surface to be a crystal grow surface was polished with the cluster ion beam, sputtering was performed to obtain a thickness of a catalyst base of about 10 μm, and planarization of the crystal grow surface was performed to expose the catalyst material in a ring-like shape. The catalyst base was made as above.

(2) Production of Carbon Nanostructure

A carbon nanotube as a carbon nanostructure was produced using the production device shown in FIG. 7 and the catalyst base obtained as above. The production device formed with heat and pressure-resistant heating furnace tube 71 including the electric furnace as the heating device, the gas introduction and exhaust system, the growth temperature control system, the vacuum control system, the gas flowmeter, a plasma cementation device, and the like was separated into a space of a non-crystal growth surface side and a space of a crystal growth surface side with catalyst base 74 inserted. Anode 75 was provided in the space of the non-crystal growth surface side. Catalyst material 72 was exposed on the non-crystal growth surface side and the crystal growth surface side. A temperature inside the production device was set to 850° C., a DC voltage was applied between anode 75 and catalyst base 74 set as a cathode, and a material gas including a methane gas, a propane gas, a hydrogen gas, and an argon gas mixed in a ratio of 1:1:1:1 was supplied at about $6\text{-}8\times10^2$ Pa (about 5-6 Torr) so as to set a current density of glow discharge to about 0.2 $mA/cm^2$ to generate plasma with glow discharge to supply ionized carbon to a surface of the catalyst base having the Fe film formed thereon, that is, to the non-crystal growth surface.

On the other hand, a carrier gas including a hydrogen gas and an argon gas was used to fill the crystal growth surface side and, after an iron oxide layer on the crystal growth surface was reduced, supply of the hydrogen gas was stopped to fill the space only with the argon gas to generate carbon nanostructure 76. A gas pressure in the space of the crystal growth surface side was set to be substantially equal to a gas pressure in the space of the non-crystal growth surface side in order to suppress deformation of the catalyst base.

As a result, generation of fibrous carbon from the crystal growth surface was recognized. Since catalyst base 74 was charged due to voltage application during the glow discharge, the fibrous carbon was also charged, and therefore the fibrous carbon was collected by attraction and taking-up by a take-up roll utilizing this charge.

When the catalyst base and the generated fibrous carbon were observed with the scanning electron microscope, it was ensured that the fibrous carbon was growing from the crystal growth surface of the catalyst material. When the fibrous carbon was further observed with the transmission electron microscope, it was ensured that the fibrous carbon was a carbon nanotube and an impurity such as amorphous carbon, graphite or the catalyst material was hardly included.

Comparative Example

Heating was performed by a method similar to that in example 1 except that a catalyst base, which included an alumina base material carrying Fe particles having an average particle diameter of about 10 nm which were generated by thermal decomposition of ferrocene, was inserted into the heat and pressure-resistant heating furnace tube. As a result, a carbon nanotube having a ring-like cross-sectional shape could be generated. When the carbon nanotube obtained was observed with the transmission electron microscope, however, presence of impurities such as Fe particles, amorphous carbon and graphite was recognized. Furthermore, since a shape of the catalyst cannot be arbitrarily changed in the method of this comparative example, a carbon nanotube having a spiral or waved cross-sectional shape cannot be grown.

Results of the examples and the comparative example show that an even and highly pure carbon nanostructure having a desired shape can be obtained using the method of the present invention.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

According to the present invention, a catalyst base having a crystal growth surface in a desired shape can be efficiently formed with relatively easy operations by adopting diameter-reduction processing. Therefore, a carbon nanostructure having an even shape can be produced with a high purity and a production cost can be reduced.

The invention claimed is:

1. A method of producing a carbon nanostructure wherein a carbon crystal is grown by vapor phase epitaxy from a crystal growth surface of a catalyst base including a catalyst material, the method comprising:

forming said catalyst base as a columnar body having said crystal growth surface at a first end surface of the columnar body and a non-crystal growth surface at a second end surface of the columnar body opposite the first end surface[, including performing diameter-reduction processing by at least one of drawing, extrusion, rolling, and forging];

forming said catalyst material to extend from said crystal growth surface to said non-crystal [grown] *growth* surface; and disposing a non-catalyst material on said crystal growth surface and on at least a portion of a side surface of said catalyst material;

wherein said non-catalyst material does not have a substantial catalytic function for growth of said carbon crystal.

2. The method of producing a carbon nanostructure according to claim 1, wherein forming said catalyst base comprises forming an aggregate including an arrangement of a plurality of catalyst structures, said catalyst structures include the non-catalyst material on said crystal growth surface and on at least a portion of a side surface of said catalyst material, said non-catalyst material is formed on at least a portion of a side surface of said aggregate, and said catalyst structures have variations of at most CV 10% in surface areas of said catalyst material on said crystal growth surface.

3. The method of producing a carbon nanostructure according to claim 1, wherein said catalyst material is formed with at least one of a member selected from the group consisting of Fe, Go, Mo, and Ni, and said non-catalyst material is formed with Ag and/or an Ag-containing alloy.

4. The method of producing a carbon nanostructure according to claim 1, wherein surface processing is performed by at least one of oxidation, nitriding and carbonization to define an interface between said catalyst material and said non-catalyst material on said crystal growth surface.

5. The method of producing a carbon nanostructure according to claim 1, wherein said catalyst base having a multilayer structure is formed by alternately stacking said catalyst material and said non-catalyst material by a vapor phase method.

[6. The method of producing a carbon nanostructure according to claim 1, wherein said diameter-reduction processing is performed such that, an outside diameter of a solid or hollow catalyst material after the diameter-reduction processing becomes at least $1\times10^{-6}$% and at most 1% of that before the diameter-reduction processing.]

7. The method of producing a carbon nanostructure according to claim 1, wherein said catalyst material has a multilayer structure on the crystal growth surface.

8. The method of producing a carbon nanostructure according to claim 1, wherein said catalyst base is formed such that, said catalyst material has at least any of a round shape, a ring-like shape, a polygonal shape, a spiral shape, a waved shape, and a branching shape on the crystal growth surface.

9. The method of producing a carbon nanostructure according to claim 1, wherein mechanical polishing and/or sputtering is performed as surface processing for said crystal growth surface.

10. The method of producing a carbon nanostructure according to claim 9, wherein an ion is entered into said catalyst material before and/or after said surface processing.

11. The method of producing a carbon nanostructure according to claim 1, comprising the steps of:

supplying carbon from a non-crystal growth surface of said catalyst base to set at least a portion of carbon in said catalyst material to a saturated state; and growing a carbon crystal from said crystal growth surface.

12. The method of producing a carbon nanostructure according to claim 1, wherein a reducing gas is brought into contact with at least the crystal growth surface of said catalyst material before or during growth of the carbon crystal.

13. The method of producing a carbon nanostructure according to claim 1, wherein a material gas and/or carbon is ionized and brought into contact with said catalyst base.

*14. The method of producing a carbon nanostructure according to claim 13, wherein said forming said catalyst*

*base includes performing diameter-reduction processing is performed by at least any of drawing, extrusion, rolling, and forging.*

*15. The method of producing a carbon nanostructure according to claim 14, wherein said diameter-reduction processing is performed such that, an outside diameter of a solid or hollow catalyst material after the diameter-reduction processing becomes at least $1\times10^{-6}$% and at most 1% of that before the diameter-reduction processing.*

* * * * *